Figure 1:
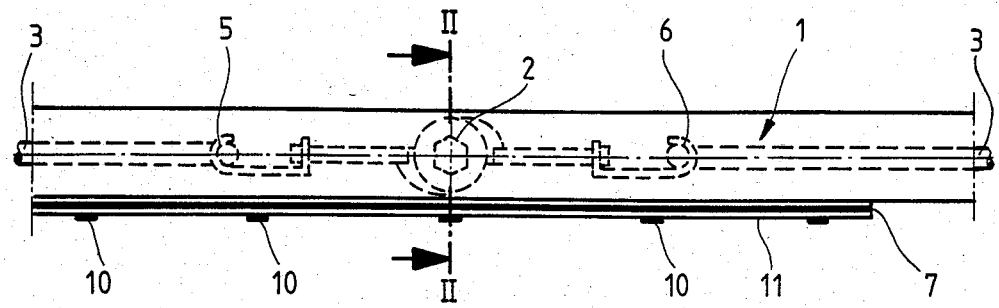

United States Patent [19]

Koch

[11] Patent Number: 4,567,832
[45] Date of Patent: Feb. 4, 1986

[54] APPLIANCE FOR COVERING THE LOCKING DEVICE OF AN ACCORDIAN PLEATED CONNECTION BELLOWS

[75] Inventor: Robert Koch, B.S. Allendorf, Fed. Rep. of Germany

[73] Assignee: Hubner Gummi-und Kunststoff GmbH, Kassel-Beteenhausen, Fed. Rep. of Germany

[21] Appl. No.: 590,116

[22] Filed: Mar. 16, 1984

[30] Foreign Application Priority Data

Mar. 18, 1983 [DE] Fed. Rep. of Germany ....... 3309898

[51] Int. Cl.⁴ ............................................. B61D 17/20
[52] U.S. Cl. ...................................... 105/20; 280/403
[58] Field of Search ....................... 105/20, 18, 19, 15, 105/8 R; 280/403

[56] References Cited

U.S. PATENT DOCUMENTS 1,056,407  3/1913  Forsyth .................................. 105/19
1,078,781  11/1913  Forsyth ................................. 105/19
1,095,909  5/1914  Midgley ................................. 105/19

FOREIGN PATENT DOCUMENTS 389005  6/1965  Switzerland ........................ 280/403

Primary Examiner—Edward K. Look
Attorney, Agent, or Firm—Alan H. Levine

[57] ABSTRACT

An appliance in which the tension cable of an accordian pleated connection bellows can be stretched in order to fasten the connection bellows to an extremity of a vehicle, between which and a following vehicle the connection bellows is situated. The covering affords easy access to the device for stretching the tension cable. For the purpose of covering, there is a flap-like strip of material fastened at the end of the accordian pleated connection bellows and made out of a material corresponding to that of the bellows material. The free end of the strip is to be fastened and detachable after covering of the cable-stretching device.

5 Claims, 4 Drawing Figures

APPLIANCE FOR COVERING THE LOCKING DEVICE OF AN ACCORDIAN PLEATED CONNECTION BELLOWS

It is common in the case of flexibly articulated vehicles, or vehicle elements, to cover the lock devices between the vehicle elements and the accordian folded connection bellows between two vehicle elements, in order to have the least possible permeability, since due to such permeability roadway dirt can gain access and thus make operation difficult when it is desired to open the lock device and dismantle the bellows. This inconvenience can be of great importance, particularly when quick removal of the bellows is necessary, for which purpose the bellows is fastened to the vehicle element with a quick-lock device. Furthermore, the cover employed to maintain the locking device clean and free of dirt is unsatisfactory if a considerable amount of time is necessary to dismantle the cover itself to gain access to the locking device.

An object of this invention is, therefore, the provision of a suitable appliance, intended for use as a covering for the locking device between vehicles and accordian pleated connection bellows, which makes possible quick assembly and disassembly of the lock device cover with minimal, or possible no, use of tools.

In the following description, an illustrative embodiment of the invention is described in detail with the aid of the accompanying drawings.

Figure 2:
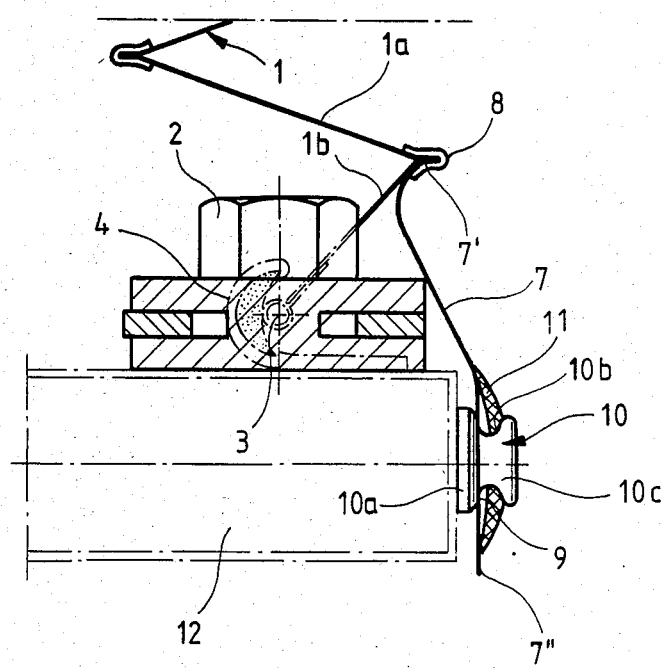
Figure 3:
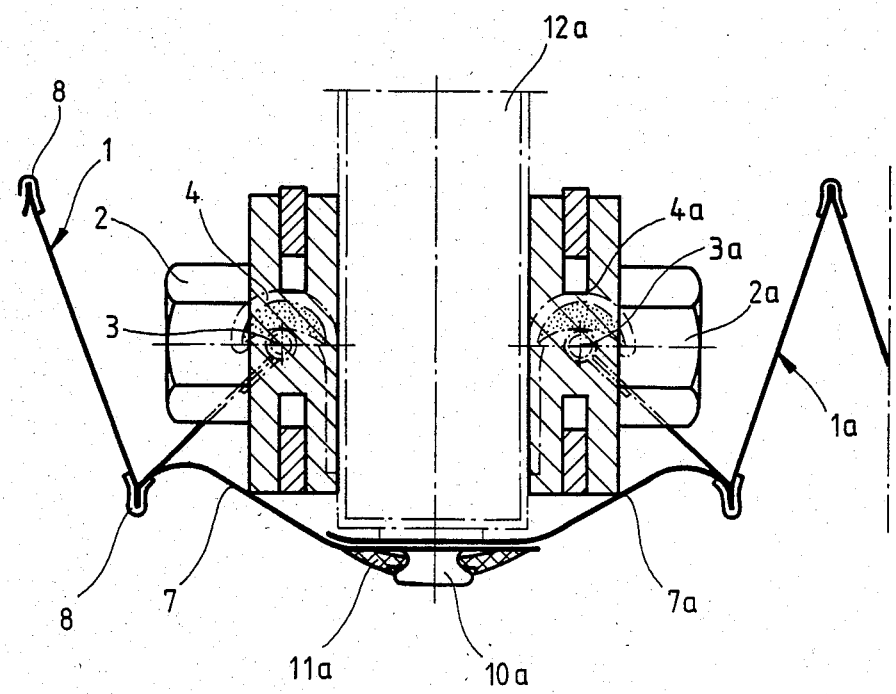
Figure 4:
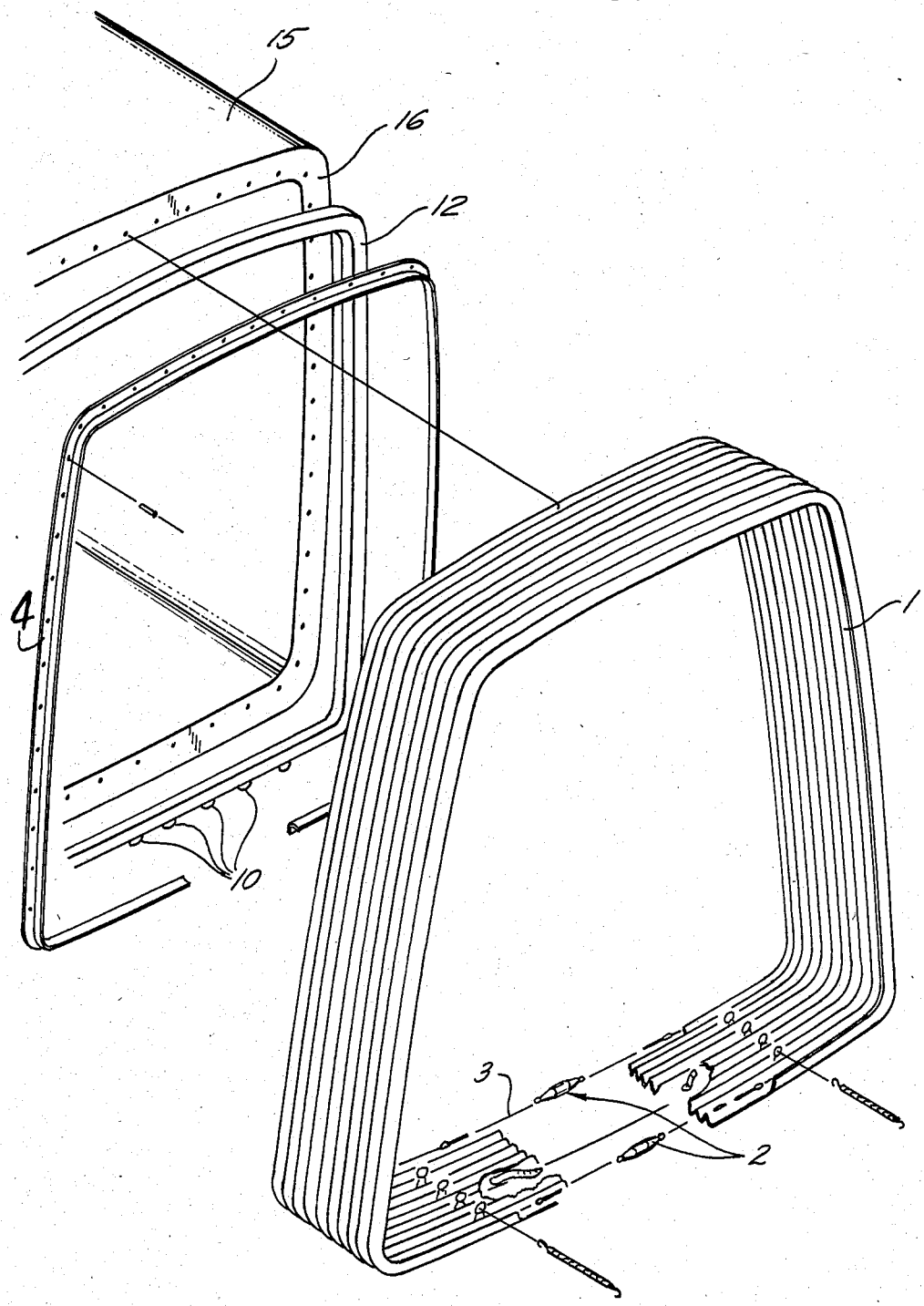

In the drawings:

FIG. 1 is a front view of the lower portion of an accordian pleated connection bellows at the point at which it is closed and, for the purpose of assembly and disassembly, it is opened;

FIG. 2 is a cross-sectional view taken along line II—II of FIG. 1, at the inner end of the bellows, that is, at the end of the bellows which is nearest to a vehicle or vehicle element; and FIG. 3 is a corresponding cross-sectional view in the region of the external connection ends of two bellows which are detachable from each other, that is, in the region of the median cross-section or the coupling level between two vehicles or vehicle elements coupled together; and FIG. 4 is an exploded perspective view of the bellows, bracket, frame, and vehicle. An accordian pleated bellows 1 (FIGS. 2 and 4) forms a closed channel enclosing the connection between two vehicles or vehicle elements which are flexibly articulated with each other. The end of one such vehicle 15 is shown in FIG. 4. In order to permit assembly and disassembly of the folded bellows, it can be opened and closed at the bottom. The opening and closing is made possibly by a locking device 2. At the end of the bellows a bracing cable 3 is incorporated into the bellows around its entire circumference and by which the bellows is fitted in a bracket 4 formed with a groove. Bracket 4 is secured to a frame 12 which in turn is mounted on the end face 16 of vehicle 15. The two free-ends of the cable are connected with coupling pieces 5 and 6 (FIG. 1), which can be moved closer to each other or further from each other by means of a control mechanism of the lock device. If the cable ends are at their smallest distance from each other, then the bellows ends are held in the groove of bracket 4. If the ends of the cables are at a larger distance from each other, then the ends of the bellows can be lifted out of the bracket 4 or fitted into bracket 4 using the cable.

According to this invention, the region of the lock device 2 is covered reliably in a simple way, in order to keep the lock device free of dirt, which may be thrown up into the region of the lock device from the roadway. For this purpose there is, in the region of the lock device, a flap 7 made of the same, or at least of a corresponding, material as the bellows. It is rot or wear resistant and water and wind tight; it is not, or in all events only slightly, elastically strechable. The bellows itself consists of individual bellows sections, which are held together at their edges by clamps 8, the clamps 8 simultaneously providing a desirable limited rigidity in a vertical direction, as well as maintaining the necessary shape of the bellows.

In the region of the lock device 2, the flap 7 is fastened to the two last bellows sections $1a$ and $1b$ with its longitudinal edge $7'$ in the last clamp 8 at the end of the bellows. The opposite longitudinal edge $7''$ of flap 7 is free. In the region of this longitudinal edge there are, along its length sloping from the cover area, several holes 9, by means of which the flap can be fastened to an appropriate number of holding pins 10. Each holding pin consists essentially of a base $10a$, a shaft $10b$ and a head $10c$. The holes 9 are dimensioned in such a way that the flap, in spite of its inelasticity, can be buttoned over the head $10c$ of the corresponding holding pins 10, so that it lies in the region of the shaft $10b$. After attachment of the flap 7 on the holding pins 10 a tension strap 11 is fastened over the holding pins 10. The tnesion strap is elastic; for example, it may be a rubber strap. While the holes 9 of the flap 7 have the same diameter as the heads $10c$ and the distances between the holes correspond to the distances between the pins, the diameter of the holes in the relaxed tension strap 11 is smaller than the diameter of the heads $10c$, e.g., they correspond approximately to the diameter of the shaft $10b$, and the distance between the holes is smaller than the distances between the pins. Therefore, the tension strap 11 must be appropriately stretched in order to be fastened to the holding pins 10. If the tension strap is fastened using suitable stretching, after which the stretch yields, then the tension strap will relax, but only to the extent permitted by the intervals of the pins, and there remains a residual tension which prevents the tension strap from falling from the holding pins, i.e., until such time that the appropriate stretching force is re-applied, such as is required to remove the strap. At the same time, the tension strap can be attached in a curved form, if necessary in the edge portion of the flap in the area to the side of the holding pins 10, to a frame 12 which is arranged at the end of the vehicle element and carries the bracket 4 and the holding pins 10. Thus no dirt or moisture from outside can gain acces to the bellows lock device 2. Furthermore, the assembly is uncomplicated in its construction and it can be brought quickly into its working and release positions without accessories, in order to protect the lock device 2, or to make it easily accessible.

The frame 12 is an end-frame at the extremity of one of two vehicles or vehicle elements, which are flexibly articulated to each other. The arrangement at the extremity of the other vehicle or vehicle element corresponds to the illustrated and described arrangement.

In general, it is common to bridge the area between two vehicles or vehicle elements not with one one-piece bellows but with two appropriately shorter bellows; the distal terminal ends of the shorter bellows are each coupled with one of the ends of the vehicle or vehicle elements using the invention as described above. The bellows ends lying opposite each other can, in accordance with the invention, be joined in the way illustrated in FIG. 3. FIG. 2 illustrates a cross-section along Line II—II in FIG. 1, at the inner ends of the bellows with reference to the vehicle elements, and FIG. 3 illustrates this aspect at the outside connecting bellows ends with reference to the vehicle elements.

Each bellows can be suspended in a bracket 4, 4a using a tensioning cable 3, 3a and both brackets 4, 4a are held on a middle bellows frame 12a. A lock device 2, 2a is assigned to each tensioning cable 3, 3a. At each bellows end, a flap 7, 7a is provided as described above, and the free ends of the flaps are fastened to the holding pins 10a so that they overlap and they are secured using the tension strap 11a, likewise in the manner described. The "a" indices refer to the similarity of the parts in FIG. 3. In the region of the connection of the two bellows the assembly, in accordance with the invention, is particularly simple in comparison to other known arrangements.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

I claim:

1. For use with a bellows employed between the opposed end faces of two pivotally interconnected vehicle sections, each end face having a groove extending substantially circumferentially around it, the bellows including at each of its ends a flexible but non-stretchable cable extending circumferentially around the bellows, the cable being sized to be accommodated within one of the grooves, and means for tensioning the cable after it is placed in the groove so as to attach the end of the bellows to one of the vehicle sections:
    a series of spaced apart pins fixed with respect to the end face of the vehicle, the pins being located in the region of the tensioning means,
    a flap of flexible material extending from an end of the bellows in the region of the tensioning means, the flap having a series of spaced apart holes adapted to engage over the series of pins, the flap covering the tensioning means when its holes are engaged over the pins, and
    an elasstic band having a series of spaced apart holes along its length, the spacing between each two successive holes in the band being less then the spacing between each two successive pins, the band being stretchable to increase the spacing between its holes so that the hole spacing corresponds to that between the pins, and the holes in the band being engaged over the pins while the band is in stretched condition and overlying the flap, so that the band retains the flap on the pins.

2. An arrangement as defined in claim 1 wherein each pin has a shaft and a larger diameter head, each hole in the flap has a dimension about equal to the diameter of the pin head, and each hole in the elastic band is sized about equal to the diameter of the pin shaft, the elasticity of the band permitting the holes in it to slide over the pin heads into engagement with the pin shafts.

3. An arrangement as defined in claim 1 wherein the pins are carried by a member which defines the groove, the member being fixed to the end face of the vehicle section.

4. An arrangement as defined in claim 1 wherein the bellows comprises individual bellows sections, each two successive sections being interconnected by a clamp, and one edge of the flap being secured to the bellows by engagement within the clamp which interconnects the two endmost sections of the bellows.

5. An arrangement as defined in claim 1 including:
    two bellows between the two vehicle sections, one end of each bellows being connected to the end face of one of the vehicle sections, the other ends of the two bellows being arranged in opposed relation,
    a member between the opposed bellows ends and extending along the peripheries of the opposed bellows ends, the member defining a groove for accommodating a cable carried by each of the opposed bellows ends,
    a series of spaced apart pins carried by the member,
    a flap of flexible material extending from each of the opposed bellows end, each flap having a series of holes adapted to engage over the series of pins, one of the flaps overlapping the other when both flaps engage the pins, and
    a single elastic band having a series of holes along its length adapted to engage over the pins only when the band is in a stretched condition, so that the band retains both flaps on the pins when it overlies the flaps and is engaged over the pins.

* * * * *